(12) United States Patent
Wintrode

(10) Patent No.: US 11,769,487 B2
(45) Date of Patent: Sep. 26, 2023

(54) SYSTEMS AND METHODS FOR VOICE TOPIC SPOTTING

(71) Applicant: RAYTHEON APPLIED SIGNAL TECHNOLOGY, INC., Sunnyvale, CA (US)

(72) Inventor: Jonathan C. Wintrode, Annapolis, MD (US)

(73) Assignee: RAYTHEON APPLIED SIGNAL TECHNOLOGY, INC., Sunnyvale, CA (US)

( * ) Notice: Subject to any disclaimer, the term of this patent is extended or adjusted under 35 U.S.C. 154(b) by 164 days.

(21) Appl. No.: 17/203,320

(22) Filed: Mar. 16, 2021

(65) Prior Publication Data

US 2022/0301548 A1 Sep. 22, 2022

(51) Int. Cl.
| | |
|---|---|
| *G10L 15/06* | (2013.01) |
| *G10L 15/08* | (2006.01) |
| *G10L 15/187* | (2013.01) |
| *G10L 15/14* | (2006.01) |
| *G10L 15/16* | (2006.01) |

(Continued)

(52) U.S. Cl.
CPC .............. *G10L 15/063* (2013.01); *G06N 3/04* (2013.01); *G10L 15/083* (2013.01); *G10L 15/142* (2013.01); *G10L 15/16* (2013.01); *G10L 15/187* (2013.01); *G10L 15/197* (2013.01); *G10L 2015/088* (2013.01)

(58) Field of Classification Search
CPC ... G10L 15/063; G10L 15/083; G10L 15/142; G10L 15/16; G10L 15/187; G10L 15/197; G10L 2015/088; G06N 3/04
See application file for complete search history.

(56) References Cited

U.S. PATENT DOCUMENTS

| | | | |
|---|---|---|---|
| 5,626,748 A * | 5/1997 | Rose | B01D 17/00 210/DIG. 5 |
| 5,675,707 A | 10/1997 | Gorin et al. | |
| 8,825,478 B2 | 9/2014 | Cox et al. | |

(Continued)

OTHER PUBLICATIONS

Liu, C., et al., "Topic Identification for Speech without ASR", in Proc. Interspeech, 2017.

(Continued)

*Primary Examiner* — Fariba Sirjani
(74) *Attorney, Agent, or Firm* — Burns & Levinson, LLP; Joseph M. Maraia

(57) ABSTRACT

A voice topic spotting system includes a learning module and a voice topic classifier module. The learning module receives training audio segments with topic labels and generates a fast keyword filter model based on a set of topic-indicative words and generates a topic identification model based on a training set of topic keyword-containing lattices. The voice topic classifier module includes an automatic speech recognition engine arranged to identify one or more keywords included in a received audio segment and output the one or more keywords. A fast keyword filter, implements the fast keyword model to output the received audio segment if a topic-indicative word is detected in the audio segment. A decoder generates a topic keyword-containing lattice associated with the audio segment. A voice topic classifier implements the voice topic identification model to determine a topic associated with received audio segment.

20 Claims, 6 Drawing Sheets

(51) Int. Cl.
*G10L 15/197* (2013.01)
*G06N 3/04* (2023.01)

(56) References Cited

U.S. PATENT DOCUMENTS

| | | | |
|---|---|---|---|
| 10,645,224 B2 | 5/2020 | Dwyer et al. | |
| 2009/0037176 A1* | 2/2009 | Arrowood | G06K 9/6257 |
| | | | 704/E15.001 |
| 2015/0100302 A1* | 4/2015 | Flaks | G10L 15/16 |
| | | | 704/9 |
| 2016/0078022 A1* | 3/2016 | Lisuk | G06N 20/00 |
| | | | 706/12 |
| 2019/0280996 A1* | 9/2019 | Dahir | G06N 20/00 |
| 2020/0004493 A1* | 1/2020 | Lee | G06F 3/017 |
| 2020/0175332 A1* | 6/2020 | Karlinsky | G06K 9/6257 |
| 2020/0242198 A1* | 7/2020 | Ji | G10L 15/16 |
| 2020/0342858 A1* | 10/2020 | Gupta | G10L 25/63 |
| 2022/0059077 A1* | 2/2022 | Thomson | G10L 25/51 |
| 2022/0068264 A1* | 3/2022 | Akel | G10L 15/16 |
| 2022/0172247 A1* | 6/2022 | Rosen | G06Q 30/0277 |

OTHER PUBLICATIONS

Wintrode, J., et al., "Content-Based Recommender Systems for Spoken Documents", in Proc. ICASSP, 2015.
Wintrode, J., Khudanpur, S., "Limited Resource Term Detection for Effective Topic Identification of Speech", in Proc. ICASSP, 2014.

* cited by examiner

SYSTEMS AND METHODS FOR VOICE TOPIC SPOTTING

TECHNICAL FIELD

This application relates generally to automatic speech recognition and, more particularly, to voice topic spotting techniques.

BACKGROUND

Automatic speech recognition (ASR) enables the recognition and translation of spoken language into text by a computer. ASRs are often used as voice user interfaces to input data or commands into a computer system via a user's voice. As ASR technology has evolved and the cost of data storage has decreased, the amount of audio data accessible to computer systems has substantially increased, resulting in the development of audio keyword search and voice topic spotting systems that enable users to more readily access relevant audio voice or speech information.

Voice Topic Spotting is the task of identifying user-specified topics of interest present in audio recordings. Users provide example audio for topics of interest, which is available for offline analysis, then during system operation, the system processes new audio recordings and decides if one or more of the user-specified topics is present in the new recordings. With a large number or high volume stream of audio recordings to process, a critical problem is the processing speed of the voice topic identification system. A secondary challenge is to minimize user input for ease of use.

Existing voice topic spotting systems have focused on call center routing, which can be described as using word and non-word acoustic content to assign a category (i.e., topic label) for decision making. An ASR is used in these cases to extract words from audio recordings (e.g., calls) and supervised topic identification is used to assign the categories from ASR word output features. Additionally, topics of interest have been derived, not from user-specified topics, but from salient or semantically related words, where "topics" are generated automatically as a "word cloud" visualization from the ASR output with topic words highlighted, allowing the system user to infer topic content from the visualization rather than a hard categorization.

ASR or Large Vocabulary Continuous Speech Recognition (LVCSR) typically constitutes over 90% of the computation cost when running topic spotting on new audio. Non word-based approaches, while potentially faster, do not perform well in terms of accurate topic labels. Unfortunately, none of the existing voice topic spotting techniques can be practically and efficiently implemented on computing platforms with relatively limited processing power while providing reliable results.

SUMMARY

The application, in various implementations, addresses deficiencies associated with the efficiency of voice topic spotting techniques.

This application describes an exemplary voice topic spotting (VTS) system configured to reduce the computation cost of identifying topics in audio recordings. The inventive systems, methods and devices described herein take a set of audio recordings and label each as 1 of N topics; extract words with confidence scores from audio using ASR/LVCSR; use machine learning (ML) to learn which ASR output keywords indicate which topic; and apply the model to ASR output of new recordings or audio messages to infer topic labels associated with each new recording or audio message. The inventive systems, methods, and devices learn what keywords predict which topics and apply that model to new audio substantially more efficiently than existing voice topic spotting techniques.

In some implementations, users can label audio recording and/or messages with topic labels. The systems, methods, and devices described herein process the audio and identify keywords associated with the topic labels, build a key word classifier and/or model based on the topic labels and/or their associated keywords, and build a topic model using standard machine learning (ML) techniques to enable runtime determinations of topic labels for new audio recordings and/or messages. The systems, methods, and devices insert the classifier into any audio KW pipeline and reject audio messages that do not contain at least one keyword of a set of keywords associated with a target topic.

In certain implementations, the present approaches build a binary (yes/no) model to detect any of a fixed set of keywords. Existing approaches attempt to match single keywords by example, resulting either in many models or a simpler comparison function. By contrast, the inventive systems, methods and devices herein learn a single function for a set of keywords. Additionally, the present implementation can be applied to a standard output of existing ASR acoustic models. The present keyword search classifier, keyword model, and/or filter can be retrofitted into existing ASR systems without the need to modify any system internals. Hence, the inventive system, methods, and devices can be applied to speed up third party ASR systems.

In some implementations, a high speed voice topic spotting (HSVST) system includes two components: 1) a learning component and 2) a runtime component. The learning component accepts audio documents and topic labels from a user and generates the following, which is used by the runtime component to increase topic spotting (also referred to as topic identification) processing speed. The learning component applies an ASR system to the audio to generate a set of word hypotheses with confidence scores. The ASR output may have some level of error. The learning component then applies the chi-squared test, such as described in Yang and Pedersen's paper *A Comparative Study on Feature Selection in Text Categorization* (ICML '97, Proceedings of the Fourteenth International Conference on Machine Learning, July 1997) to select the top 1000 topic-indicative words, the entire contents of which are incorporated herein by reference.

The learning system then makes use of a fast keyword filtering system such as described in U.S. patent application Ser. No. 16/929,383, filed on Jul. 15, 2020, and entitled "Systems and Methods for Fast Audio Keyword Search," the entire contents of which are incorporated herein by reference. The exemplary fast keyword filtering system is used to build a keyword filter for the topic words. Finally, the learning system builds a supervised topic classifier using a Naïve Bayes classifier on the audio segments containing any of the 1000 keywords.

The runtime component executes on new audio recordings, by first applying the learned keyword filter to process only topic-keyword containing segments. Audio segments, recordings, and/or messages without keywords are rejected which saves computer processing resources and time. Segments identified as containing keywords are fully processed with the ASR system and the word outputs are given to the learned topic classifier and a topic label or labels is generated. A primary inventive concept includes the coupling of the topic label prediction with a KW filter model at both learning and runtime.

In certain implementations, the inclusion of a fast keyword filter into the runtime component results in the system only generating ASR word outputs for potentially topically relevant audio segments is unique to this system and is what drives the speed improvement. The automated training of the filter from only user document-level markings is an improvement over the original keyword filtering system, which required a user to mark individual audio segments. This reduces the annotation burden on the user from having to identify 500-5000 audio segments down to 10-100 topic-relevant documents.

Because an ASR implements a computationally intensive multi-stage process, the approaches described herein speed up the execution time by identifying audio segments, messages, and/or recordings for which the stages of the ASR process may be omitted. The system, methods, and devices described herein include two top-level components, a learning module and a runtime VTS module. The ASR engine may be provided by a third party.

In one aspect, a voice topic spotting system includes a learning module arranged to: i) receive a plurality of training audio segments, ii) receive segment topic labels associated with the each of the plurality of audio speech segments, iii) execute a first automatic speech recognition engine to extract a plurality of topic keyword hypotheses associated with the plurality of audio speech segments; iv) apply a chi-squared test to select a set of topic-indicative words as a subset of the plurality of topic keyword hypotheses and select a training set of topic keyword-containing lattices associated with the set of topic-indicative words; iv) generate a fast keyword filter model based on the set of topic-indicative words, and v) generate a topic identification model based on the training set of topic keyword-containing lattices.

The voice topic spotting system also includes a voice topic classifier module having a second automatic speech recognition engine arranged to identify one or more keywords included in a received audio segment and output the one or more keywords. The voice topic classifier module also includes a fast keyword filter, implementing the fast keyword model, arranged to receive the one or more keywords. The fast keyword filter detects whether the received audio segment includes any keywords of the set of topic-indicative words and, if detected, outputs the received audio segment as a topic keyword-containing audio segment but, if not detected, not output the received audio segment.

The voice topic classifier module also includes a decoder arranged to, if the topic keyword-containing audio segment is outputted by the keyword filter, receive the topic keyword-containing audio segment and generate a topic keyword-containing lattice associated with the topic keyword-containing audio segment. The voice topic classifier module further includes a voice topic classifier, implementing the voice topic identification model, arranged to receive the topic keyword-containing lattice and execute a machine learning technique to determine a topic associated with the topic keyword-containing audio segment.

The fast keyword filter may include a direct classification technique. The fast keyword filter may include a Naïve Bayes classifier with bag of phone N-grams. The bag of phone N-grams may include phone bigrams. The fast keyword filter may include a convolutional neural network (CNN). The plurality of topic keyword hypotheses may be represented as phone N-grams.

The first automatic search recognition engine may be the same as the second automatic search recognition engine. The first automatic search recognition engine may include a deep neural network acoustic model. The decoder may include a finite state transducer (FST) decoder. The decoder may implement a Hidden Markov Model (HMM). In some implementations, the topic identification model includes a Naïve Bayes bag of words. The Naïve Bayes bag of words may be weighted by a lattice probabilities associated with the training set of the topic keyword-containing lattices. The audio segment may have a duration greater than or equal to 10 seconds. The set of topic-indicative words may be less than or equal to 1000 words.

In another aspect, a voice topic spotting learning system includes a communications interface arranged to: i) receive a plurality of training audio segments and segment topic labels associated with each of the plurality of audio segments, ii) output a fast keyword filter model to a voice topic classifier, and iii) output a topic identification model to the voice topic classifier.

The voice topic spotting learning system also includes a processor, in electrical communication with the communications interface, arranged to implement and/or execute an automatic speech recognition engine to extract a plurality of topic keyword hypotheses associated with the plurality of audio speech segments. The processor implements a chi-squared tester that applies a chi-squared test to select a set of topic-indicative words as a subset of the plurality of topic keyword hypotheses and select a training set of topic keyword-containing lattices associated with the set of topic-indicative words. The processor further generates the fast keyword filter model based on the set of topic-indicative words and generates the topic identification model based on the training set of topic keyword-containing lattices.

The segment topic labels may include an amount of different labels that are less than or equal one of 10, 20, 40, 50, 100, and 200. In some implementations, the fast keyword filter model and the topic identification model are generated offline before the voice topic classifier receives an audio segment for voice topic identification.

In a further aspect, a runtime voice topic spotting classifier system includes a communications interface arranged to: i) receive an audio segment, ii) receive a fast keyword filter model from a voice topic spotting learning system, and iii) receive a topic identification model from the voice topic spotting learning system. The voice topic spotting classifier system also includes an automatic speech recognition engine arranged to identify one or more keywords included in a received audio segment and output the one or more keywords. The classifier system further includes a fast keyword filter, implementing the received fast keyword model, arranged to receive the one or more keywords and detect whether the received audio segment includes any keywords of the set of topic-indicative words and, if detected, output the received audio segment as a topic keyword-containing audio segment but, if not detected, not output the received audio segment.

The classifier system includes a decoder arranged to, if the topic keyword-containing audio segment is outputted by the keyword filter, receive the topic keyword-containing audio segment and generate a topic keyword-containing lattice associated with the topic keyword-containing audio segment. The classifier system also includes a voice topic classifier, implementing the received voice topic identification model, arranged to receive the topic keyword-containing lattice and execute a machine learning technique to determine a topic associated with the topic keyword-containing audio segment. The audio segment may have a duration greater than or equal to 10 seconds. The audio segment may be included in an audio data file.

It will be apparent to those of ordinary skill in the art that certain aspects involved in the operation of the systems 300 and 400 and other servers or devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

The application, in various aspects, addresses deficiencies associated with conventional voice topic spotting systems. The application includes exemplary systems, methods, devices for voice topic spotting configured to speed up the execution time by identifying audio recordings for which the computationally expensive stages of the ASR process may be omitted. In this way, substantially less processing power is used in the VTS pipeline to perform voice topic spotting. This, in turn, enables a VTS system and/or application to run more efficiently and/or at high speeds on platforms having relatively lower processing capability such as, for example, a mobile computing device.

Figure 1:
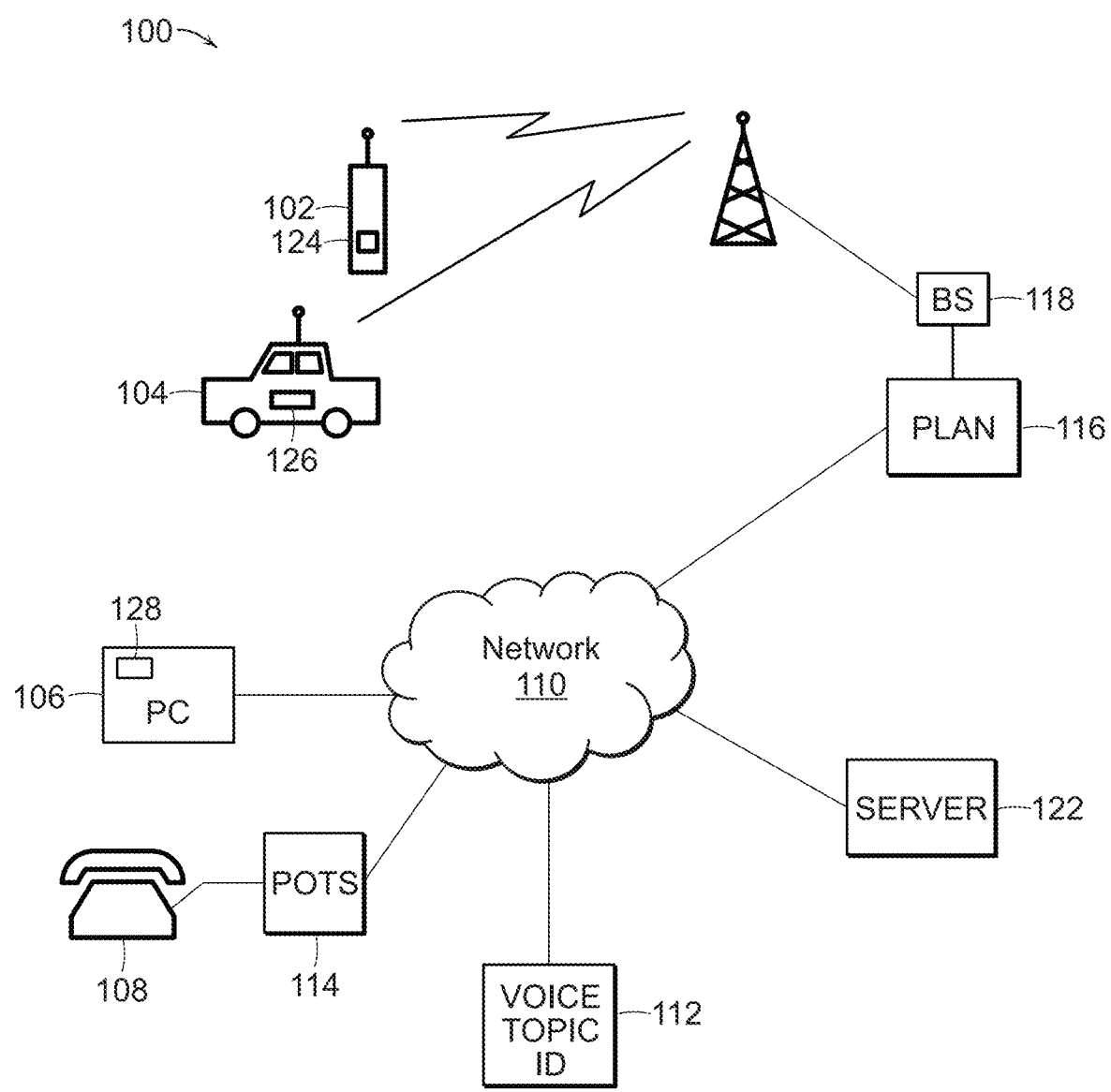
FIG. 1 is an illustration of a communication network including a voice topic spotting system.

FIG. 1 is an illustration of a communication system 100 including various end user devices such as mobile computing device 102, vehicle 104, computer 106, and telephone 108. Mobile computing device 102 may include a wireless communications devices such as, without limitation, a cellular telephone, computing tablet, portable computer, and so on. Devices 102, 104, and 106 may include a VTS application and/or module 124, 126, and 128 respectively. System 100 may also include a VTS/ASR server 112 and communications server 122. Various components of system 100 may communicate via network 110 which may include the Internet, a local area network, a Wifi or 802.11 network, a private network, a wireless network, and/or satellite network. Wireless communications devices 102 and 104 may communicate with other devices, servers, and/or entities connected to network 110 via public land mobile network (PLMN) 116 and base station 118. PLMN 116 may include a CDMA, 802.11, TDMA, 3G, 4G, 5G, GSM, and/or a long term evolution (LTE) network, and the like. While FIG. 1 illustrates an exemplary data network system 100, it should be understood by one or ordinary skill that a VTS application and/or module 124, 126, 128 and/or VTS/ASR server 112 may operate within any communications network and/or environment.

As will be discussed in detail with respect to FIGS. 3 and 4 later herein, VTS modules 124, 126, and 128 enable a user of device 102, 104 and 106 respectively to input audio information and/or data via a user interface of the devices 102, 104, and 106 that can then be processed to identify topics associated with the audio information by modules 124, 126, and 128. In addition to providing automatic speech recognition, modules 102, 104, and 106 provide VTS and/or keyword search capabilities that enable rapid and efficient identification of, for example, audio including information associated with topics of interest or information about topics targeted for identification.

Figure 2:
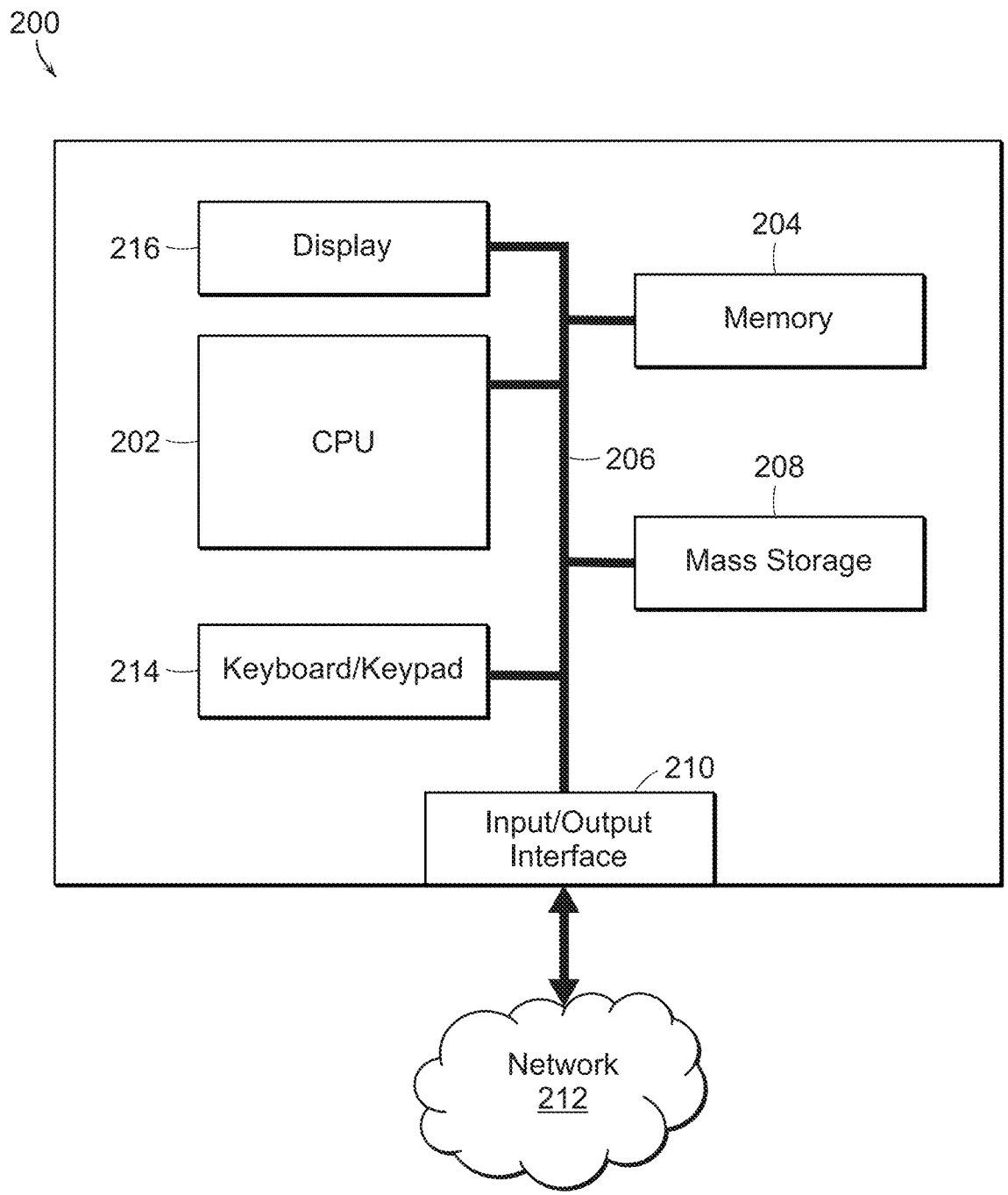
FIG. 2 is block diagram of a computer system arranged to perform processing associated with a voice topic spotting system.

FIG. 2 is block diagram of a computer system 200 arranged to perform processing associated with a keyword search system such as, for example, modules 124, 126, and 128, server 112, systems 300 and 400, which are discussed in detail later herein. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, solid state drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid state memories, for storing data and instructions for use by the CPU 202. At least one component of the mass storage system 208, preferably in the form of a non-volatile disk drive, solid state, or tape drive, stores the database used for processing image data and/or running artificial intelligence (AI) engines and neural networks of an ASR, VTS, and/or KW filtering system. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a module 124, 126, and 128 and/or server 112 according to FIG. 1, the data interface 210 may provide a relatively high-speed link to a network 212 and/or network 110, such as an intranet, internet, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed multi-sensor processing. Alternatively, computer system 200 may include a mainframe or other type of host computer system capable of Web-based communications via network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Computer system 200 may include one or more microphones and/or speakers to facilitate voice and/or audio communications with a user. Server operations personnel may interact with the system 200 for controlling and/or programming the system from remote terminal devices via the network 212.

The computer system 200 may run a variety of application programs and store associated data in a database of mass storage system 208. One or more such applications may include a VTS, system, KWS system and/or an ASR such as described with respect to FIGS. 3 and 4.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as machine learning (ML), deep learning, and artificial intelligence using neural networks. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, Scala, CoffeeScript, Emacs Lisp, Swift, Fortran, or Visual BASIC. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with the system 300 and/or 400, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 300 and/or 400 includes a networked-based, e.g., Internet-based, application that may be configured and run on the system 200 and/or any combination of the other components of the system 300 and/or 400. The server 112 and/or computer system 200 may include a web server running a Web 2.0 application or the like. Web applications running on systems 300 and/or 400 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain implementations, system 200, 300, and/or 400 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The computer 200, server 122, devices 102, 104, and 106, system 300, system 400, or another components of systems 300 and 400 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 3:
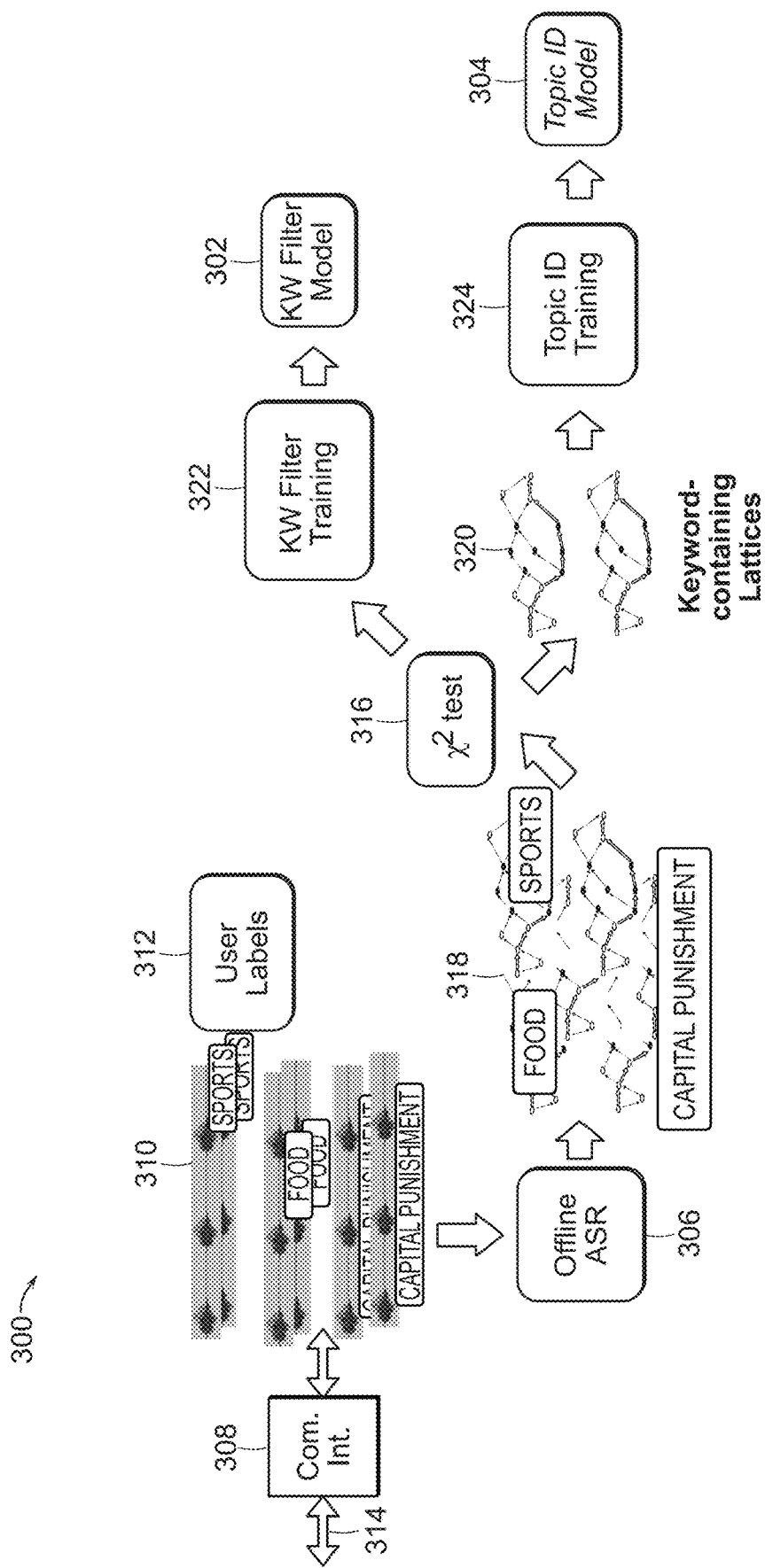
FIG. 3 is a block diagram of a voice topic spotting learning system, module, and/or pipeline arranged to generate a keyword filter model and voice topic identification model.

FIG. 3 is a block diagram of a voice topic spotting (VTS) learning system, module, and/or pipeline 300 arranged to generate a keyword filter model 302 and voice topic identification model 304. VTS learning system 300 includes an ASR 306 and a communications interface 308 arranged to:

i) receive a plurality of training audio segments 310 and segment topic labels 312 associated with each of the plurality of audio segments 310. The communications interface 308 may receive the training audio segments 310 and associated segment topic labels 312 via a data channel 314. The segment topic labels 312 may be assigned by a user via the communications interface 308. Communications interface 308 may then send the received training audio segments 310 and segment topic labels 312 to ASR 306 for processing. Communications interface 308 may output a fast keyword filter model 302 to a voice topic classifier 400, such as described in FIG. 4, via data channel 314. Communications interface 308 may also output topic identification model 304 to voice topic classifier 400 via data channel 314.

VTS learning system 300 may include a processor, in electrical communication with communications interface 308, arranged to execute ASR 306 and/or an automatic speech recognition engine to extract a plurality of topic keyword hypotheses associated with the plurality of training audio segments 310. ASR 306 may output one or more word lattices 318 from its decoder associated with topic labels 312. In some implementations, VTS learning system 300 implements a chi-squared tester 316 that applies a chi-squared test to select a set of topic-indicative words as a subset of the plurality of topic keyword hypotheses and select a training set of topic keyword-containing lattices 320 associated with the set of topic-indicative words. VTS learning system 300 uses a keyword filter training module 322 to generate the fast keyword filter model 302 based on the set of topic-indicative words. VTS learning system 300 also uses topic identification (ID) module 324 to generate topic identification model 304 based on the training set of topic keyword-containing lattices 320.

The segment topic labels 312 may include an amount of different labels that are less than or equal one of 10, 20, 40, 50, 100, and 200. In some implementations, the fast keyword filter model 302 and the topic identification model 304 are generated offline before the voice topic classifier 400 receives an audio segment for voice topic identification. In some implementations, ASR 306 uses a Hidden Markov Model deep neural network (HMM-DNN) to recognize the speech and/or words within training audio segments 310.

The fast keyword filter model 302 may include a direct classification technique such as a Naïve Bayes classifier with bag of phone N-grams. The bag of phone N-grams may include phone bigrams. The fast keyword filter model 302 may include a convolutional neural network. The plurality of topic keyword hypotheses may be represented a phone N-grams. ASR 306 may include a deep neural network acoustic model. ASR 306 may include a decoder such as a finite state transducer (FST) decoder. The ASR 306 decoder may implement a Hidden Markov Model (HMM). The topic identification model 304 may include a Naïve Bayes bag of words. In some implementations, the Naïve Bayes bag of words are weighted by lattice probabilities associated with the training set of the topic keyword-containing lattices 320. A training audio segment 310 may have a duration greater than or equal to 10 seconds. The set of topic-indicative words may be less than or equal to 1000 words.

Figure 4:
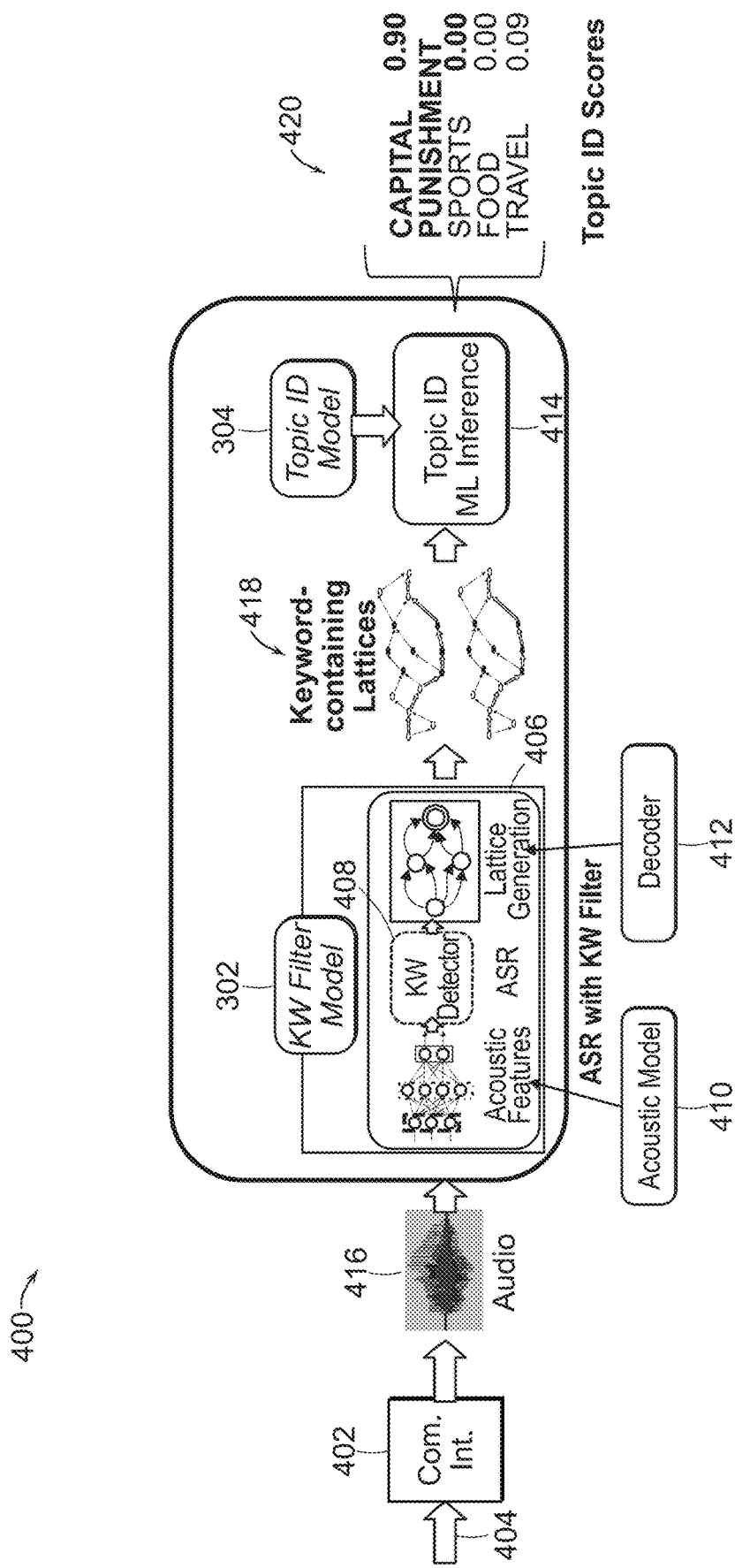
FIG. 4 is a block diagram of a runtime voice topic spotting component of a voice topic spotting system.

FIG. 4 is a block diagram of a runtime voice topic spotting (VTS) classifier system, module, pipeline, and/or component 400 of a voice topic spotting system. Runtime VTS classifier system 400 includes a communications interface 402 that receives a data signal 404, ASR 406 including fast keyword filter 408 that implements fast keyword filter model 302 from VTS learning system 300. ASR 406 includes acoustic model 410 and decoder 412. VTS classifier system 400 also includes topic identification machine learning (ML) inference module 414 that implements topic identification model 304 from VTS learning system 300.

In operation, communications interface and/or receiver 402 receives a communication signal and/or data message 404 which may include an electronic signal transmitted via a wireless and/or wireline medium. Receiver 402 may de-modulate and/or extract a received audio signal and/or segment from signal 404 which includes at least one audio segment 416 that is output to ASR 406. In some implementations, ASR 406 may include a speech activity detector (SAD) that uses a deep neural network (DNN) model to detect whether audio segment 416 includes speech. Those audio segments determined to include speech may be passed on for further processing by ASR 406, while segments without speech are discarded. In some implementations, ASR 406 uses a Hidden Markov Model deep neural network (HMM-DNN) to recognize speech within a received audio segment such as segment 416.

Each segment 416 may have a duration greater than or equal to 10 seconds. In one implementation, KW filter and/or detector 408, and KW filter model 302, uses a HMM-DNN model or another neural network model to define a classification function that is used by KW filter 408 to filter out and/or omit audio segments such as segment 416 that do not contain a keyword in set of topic-indicative words determined by VTS learning system 300.

In some implementations, communications interface and/or receiver 402 is also arranged to receive fast keyword filter model 302 from a voice topic spotting learning system 300 and receive topic identification model 304 from the voice topic spotting learning system 300. ASR 406 may be arranged to identify one or more keywords included in received audio segment 416 using acoustic model 410 and output the one or more keywords. In some implementations, ASR 406 uses DNN acoustic model 416, which may include a Hidden Markov Model deep neural network (HMM-DNN) to recognize the speech and/or words within audio segment 416. DNN acoustic model 410 may include other acoustic models such as, without limitation, a recursive DNN Fast keyword (KW) filter and/or detector 408, implementing the received fast keyword model 302, may be arranged to receive the one or more keywords and detect whether the received audio segment 416 includes any keywords of the set of topic-indicative words and, if detected, output the received audio segment 416 as a topic keyword-containing audio segment but, if not detected, not output the received audio segment 416. In one implementation, fast KW filter 408 uses ASR acoustic model 410 which may include an HMM-DNN model or another neural network model to define a keyword classifier.

ASR 406 may include decoder 412 arranged to, if the topic keyword-containing audio segment is outputted by fast KW filter 408, receive the topic keyword-containing audio segment and generate a topic keyword-containing lattice 418 associated with the topic keyword-containing audio segment. System 400 may also include a voice topic classifier 414, implementing received voice topic identification model 304, arranged to receive the topic keyword-containing lattice 418 and execute a machine learning technique to determine a topic 420 associated with the topic keyword-containing audio segment, e.g., "capital punishment." In some implementations, system 420 outputs and/or displays the determine topic 420 associated with received audio segment 416 along with other possible topics in a list including an indicator of the identified topic 420. In one implementation, a list of topics and their associated probability of being the detected topic is displayed. FIG. 4 illustrates that topic "capital punishment" is the most likely topic 420 of received audio segment 416 with a 90% and/or 0.90 out of 1 likelihood. The received audio segment 416 may have a duration greater than or equal to 10 seconds. The received audio segment 416 may be included in an audio data file.

In some implementations, decoder 412 may include a phoneme and/or word decoder such as, for example, a finite state transducer (FST) decoder configured to form a word and/or phoneme lattice associated with each of audio segment 416. The formulation and processing associated with performing speech recognition by decoder 412 can account for a substantial percentage of the processing cost expended by system 400 to perform voice topic spotting. One reason for this is that decoder 412 usually must process every audio segment such as segment 416 even though a substantial portion of the processed audio segments may not include information associated with target topics of interest. By including KW module 302 and KW filter 408 in ASR 406 that pre-filters out or omits those audio segments that are not related to target topics of interest, ASR 406 is able to perform automatic speech recognition substantially more efficiently, more rapidly, and by utilizing substantially less processing power of a device such as devices 102, 104, 106 and server 112.

ASR 406 may then output one or more keyword-containing lattices 418 from decoder 410. The lattices 418 may be processed by a word posterior indexing function which may formulate one or more inverted indices. To determine whether a keyword of a set of topic-indicative words is present within an audio segment such as segment 416, a decision threshold function may assign a score related to a probability of the presence of any keywords associated with a topic of interest. If the score is determined to be greater than or equal to the threshold value, the pipeline and/or system 400 determines that the audio segment 416 includes a keyword of the set of topic-indicative words and, therefore is related to one of the target topics. System 400 may store audio segment 416 and/or forward audio segment 416 to another system and/or server 122 for further review or processing. In some implementations ASR 306 and ASR 406 are the same ASR.

Figures 5A, 5B:
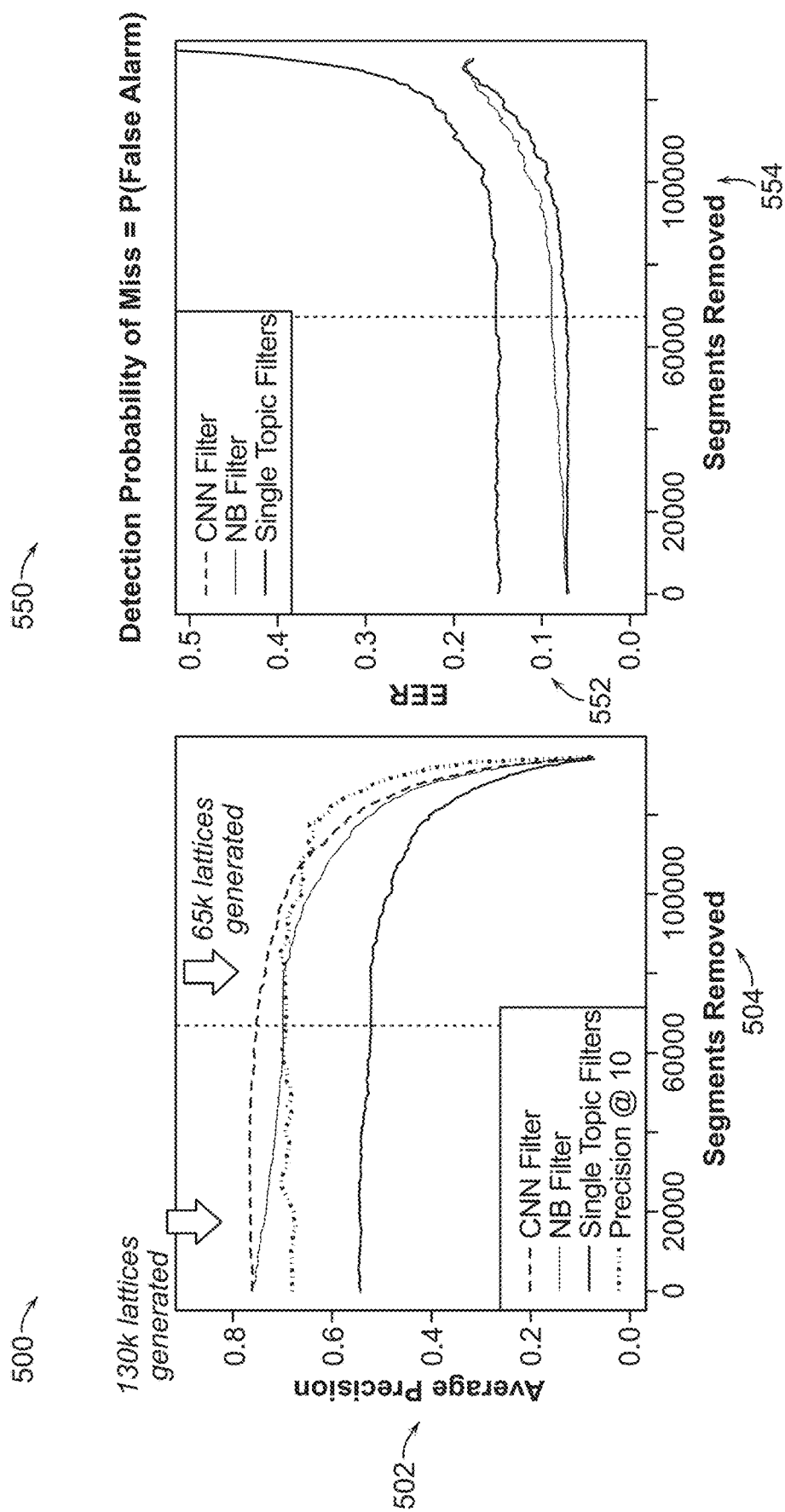
FIGS. 5A and 5B show Topic ID Accuracy vs. Processing based on processing Fisher English 40-topic CTS Data.

FIGS. 5A and 5B show graphs 500 and 550 of Topic ID Accuracy vs. Processing based on processing Fisher English 40-topic conversational telephone speech (CTS) Data. Graph 502 shows plots of average precision 502 vs. audio segments removed 504 for various filtering techniques including CNN filter, NB filter, Single Topic filters, and Precision @ 10 filter. Graph 550 shows plots of equal error rate (EER) 552 vs. audio segments removed 554 for various filtering techniques including CNN filter, NB filter, and Single Topic filters. FIGS. 5A and 5B indicate that near-baseline topic detection can be achieved when filtering about 50% of audio segments. Processing speed up depends on the data, however linguistically, most files do not contain keywords. Given the lattice decoder consumes 33% of processing and/or CPU time for a batch of audio, the 50% threshold reduces overall processing time by about 16.5%. Even greater speedup is expected on larger data sets.

Figures 6A, 6B:
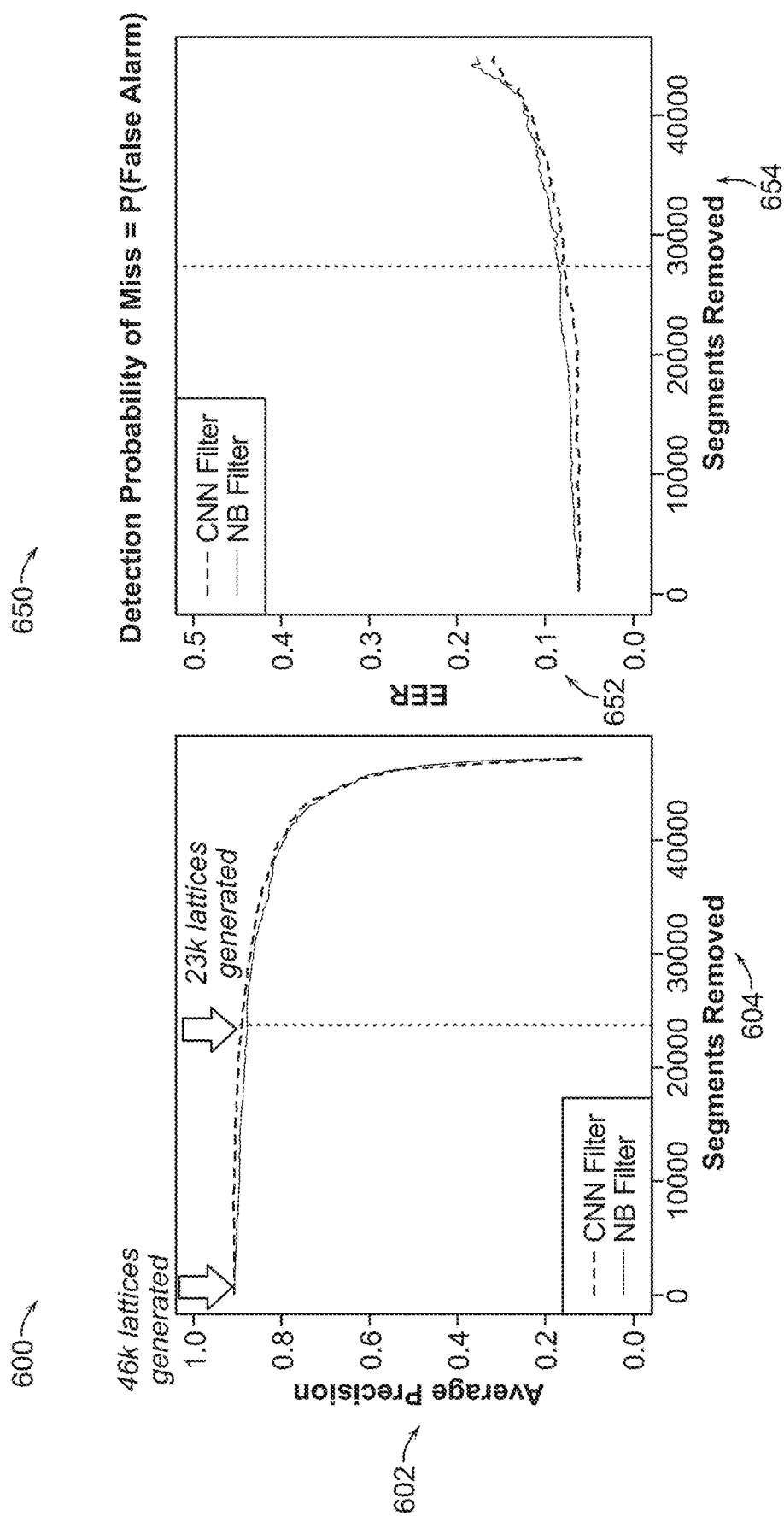
FIGS. 6A and 6B show Topic ID Accuracy vs. Processing based on processing Mandarin Chinese 15-topic CTS Data.

FIGS. 6A and 6B show graphs 600 and 650 of Topic ID Accuracy vs. Processing based on processing Mandarin Chinese 15-topic CTS Data. Graph 602 shows plots of average precision 602 vs. audio segments removed 604 for various filtering techniques including a CNN filter and NB filter. Graph 650 shows plots of equal error rate (EER) 652 vs. audio segments removed 654 for various filtering techniques including a CNN filter and NB filter. Like FIGS. 5A and 5B, FIGS. 6A and 6B indicate that near-baseline topic detection can be achieved when filtering about 90% of audio segments. Importantly, FIGS. 6A and 6B indicate that voice topic spotting techniques are effective regardless of the language being analyzed by systems 300 and 400.

It will be apparent to those of ordinary skill in the art that certain aspects involved in the operation of the system 300 or system 400, server 112, and other devices such as devices 102, 104, and 106 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. A voice topic spotting system comprising:
a learning module arranged to: i) receive a plurality of training audio segments, ii) receive segment topic labels associated with the each of the plurality of training audio segments, iii) execute a first automatic speech recognition engine to extract a plurality of topic keyword hypotheses associated with the plurality of training audio segments, wherein the first automatic speech recognition engine uses a Hidden Markov model to recognize speech within the training audio segments; iv) apply a chi-squared test to select a set of topic-indicative words as a subset of the plurality of topic keyword hypotheses and select a training set of topic keyword-containing lattices associated with the set of topic-indicative words; iv) generate a fast keyword filter model based on the set of topic-indicative words, and v) generate a topic identification model based on the training set of topic keyword-containing lattices; and
a voice topic classifier module including:
a second automatic speech recognition engine arranged to identify one or more keywords included in a received audio segment and output the one or more keywords;
a fast keyword filter, implementing the fast keyword model, arranged to receive the one or more keywords and detect whether the received audio segment includes any keywords of the set of topic-indicative words and, if detected, output the received audio segment as a topic keyword-containing audio segment but, if not detected, not output the received audio segment;
a decoder arranged to, if the topic keyword-containing audio segment is outputted by the keyword filter, receive the topic keyword-containing audio segment and generate a topic keyword-containing lattice associated with the topic keyword-containing audio segment; and a voice topic classifier, implementing the topic identification model, arranged to receive the topic keyword-containing lattice and execute a machine learning technique to determine a topic associated with the topic keyword-containing audio segment, where a word posterior indexing function processes the topic keyword-containing lattice to formulate one or more inverted indices to identify the topic associated with the topic keyword-containing audio segment in the voice topic identification model.

2. The system of claim 1, wherein the fast keyword filter includes a direct classification technique.

3. The system of claim 2, wherein the fast keyword filter includes a Naïve Bayes classifier with bag of phone N-grams.

4. The system of claim 3, wherein the bag of phone N-grams includes phone bigrams.

5. The system of claim 1, wherein the fast keyword filter includes a convolutional neural network.

6. The system of claim 1, wherein plurality of topic keyword hypotheses are represented as phone N-grams.

7. The system of claim 1, wherein the first automatic speech recognition engine is the same as the second automatic search recognition engine.

8. The system of claim 7, wherein the first automatic speech recognition engine includes a deep neural network acoustic model.

9. The system of claim 1, wherein the decoder includes a finite state transducer (FST) decoder.

10. The system of claim 9, wherein the decoder implements a Hidden Markov Model (HMM).

11. The system of claim 1, wherein the topic identification model includes a Naïve Bayes bag of words.

12. The system of claim 11, wherein the Naïve Bayes bag of words are weighted by lattice probabilities associated with the training set of the topic keyword-containing lattices.

13. The system of claim 1, wherein the audio segment has a duration greater than or equal to 10 seconds.

14. The system of claim 1, wherein the set of topic-indicative words is less than or equal to 1000 words.

15. A voice topic spotting learning system comprising:
a communications interface arranged to: i) receive a plurality of training audio segments and segment topic labels associated with each of the plurality of audio segments, ii) output a fast keyword filter model to a voice topic classifier, and iii) output a topic identification model to the voice topic classifier; and a processor, in electrical communication with the communications interface, arranged to: i) execute an automatic speech recognition engine to extract a plurality of topic keyword hypotheses associated with the plurality of audio speech segments, wherein the automatic speech recognition engine uses a Hidden Markov model to recognize speech within the training audio segments; ii) apply a chi-squared test to select a set of topic-indicative words as a subset of the plurality of topic keyword hypotheses and select a training set of topic keyword-containing lattices associated with the set of topic-indicative words; iii) generate the fast keyword filter model based on the set of topic-indicative words, and iv) generate the topic identification model based on the training set of topic keyword-containing lattices, where a word posterior indexing function processes the topic keyword-containing lattices to formulate one or more inverted indices to identify the topic associated with the topic keyword-containing audio segment in the topic identification model.

16. The system of claim 15, wherein the segment topic labels include an amount of different labels that are less than or equal one of 10, 20, 40, 50, 100, and 200.

17. The system of claim 15, wherein the fast keyword filter model and the topic identification model are generated offline before the voice topic classifier receives an audio segment for voice topic identification.

18. A runtime voice topic spotting classifier system comprising:
a communications interface arranged to: i) receive an audio segment, ii) receive a fast keyword filter model from a voice topic spotting learning system, and iii) receive a topic identification model from the voice topic spotting learning system; and an automatic speech recognition engine arranged to identify one or more keywords included in a received audio segment and output the one or more keywords, wherein the automatic speech recognition engine uses a Hidden Markov model to recognize speech within the training audio segments;

a fast keyword filter, implementing the received fast keyword model, arranged to receive the one or more keywords and detect whether the received audio segment includes any keywords of the set of topic-indicative words and, if detected, output the received audio segment as a topic keyword-containing audio segment but, if not detected, not output the received audio segment:

a decoder arranged to, if the topic keyword-containing audio segment is outputted by the keyword filter, receive the topic keyword-containing audio segment and generate a topic keyword-containing lattice associated with the topic keyword-containing audio segment; and a voice topic classifier, implementing the received topic identification model, arranged to receive the topic keyword-containing lattice and execute a machine learning technique to determine a topic associated with the topic keyword-containing audio segment, where a word posterior indexing function processes the topic keyword-containing lattice to formulate one or more inverted indices to identify the topic associated with the tonic keyword-containing audio segment in the voice topic identification model.

19. The system of claim 18, wherein the audio segment has a duration greater than or equal to 10 seconds.

20. The system of claim 19, wherein the audio segment includes an audio data file.

* * * * *